US011734602B2

United States Patent
Lynch et al.

(10) Patent No.: US 11,734,602 B2
(45) Date of Patent: Aug. 22, 2023

(54) METHODS AND SYSTEMS FOR AUTOMATED FEATURE GENERATION UTILIZING FORMULA SEMANTIFICATION

(71) Applicant: INTERNATIONAL BUSINESS MACHINES CORPORATION, Armonk, NY (US)

(72) Inventors: William Karol Lynch, Rathkeale (IE); Oktie Hassanzadeh, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 875 days.

(21) Appl. No.: 16/659,249

(22) Filed: Oct. 21, 2019

(65) Prior Publication Data

US 2021/0117853 A1  Apr. 22, 2021

(51) Int. Cl.
| | |
|---|---|
| G06F 16/00 | (2019.01) |
| G06N 20/00 | (2019.01) |
| G06N 5/04 | (2023.01) |
| G06N 5/02 | (2023.01) |
| G06F 16/22 | (2019.01) |
| G06F 40/30 | (2020.01) |

(52) U.S. Cl.
CPC ......... *G06N 20/00* (2019.01); *G06F 16/2228* (2019.01); *G06F 40/30* (2020.01); *G06N 5/02* (2013.01); *G06N 5/04* (2013.01)

(58) Field of Classification Search
CPC .... G06F 16/2228; G06F 40/30; G06F 16/951; G06F 16/81; G06F 16/80; G06F 40/279; G06F 40/169; G06F 30/20; G06N 5/04; G06N 20/00; G06N 5/02; G06N 5/003; G06N 5/025
See application file for complete search history.

(56) References Cited

U.S. PATENT DOCUMENTS

| | | | |
|---|---|---|---|
| 10,324,961 B2 | 6/2019 | Chen et al. | |
| 10,891,673 B1* | 1/2021 | Sawaf | G06Q 30/0643 |
| 2019/0384640 A1* | 12/2019 | Swamy | G06F 16/901 |
| 2020/0242487 A1* | 7/2020 | Jain | H04L 43/08 |

OTHER PUBLICATIONS

Schubotz et al., "Semanification of Identifiers in Mathematics for Better Math Information Retrieval.", in: SIGIR, Pisa, Italy. 2016, pp. 135-144. doi:10.1145/2911451.2911503.
Lam et al., "One Button Machine for Automating Feature Engineering in Relational Databases", preprint arXiv:1706.00327.
Khurana et al., "Feature engineering for predicitive Modeling Using Reinforcement Learning". Proceedings of the Thirty-Second AAAI Conference on Aililicial Intelligence, New Orleans, Louisiana, USA, Feb. 2-7, 2018. AAAI Press.
(Continued)

*Primary Examiner* — Yicun Wu
(74) *Attorney, Agent, or Firm* — Griffiths & Seaton PLLC (57) ABSTRACT

Embodiments for automated feature engineering are provided. Data associated with a machine learning model is received. The received data is mapped to at least one description associated with the data. A feature for the machine learning model is generated based on a formula within a corpus. The formula is associated with the at least one description.

21 Claims, 6 Drawing Sheets

(56) References Cited

OTHER PUBLICATIONS

Bengio et al., "Representation learning:A review and new perspectives". IEEE transactions on pattern analysis and machine intelligence, 35(8):1798-1828.

"Automated feature generation from structured knowledge," Cheng, et al., Proceedings of the 20th ACM international conference on information and knowledge management, pp. 1395-1404, ACM, 2011, (10 Pages).

"Deep feature synthesis: Towards automating data science endeavors," Kanter et al., 2015 IEEE International Conference on Data Science and Advanced Analytics (DSAA), (10 Pages).

* cited by examiner

Monthly Payment Formula

The fixed monthly payment for a fixed rate mortgage is the amount paid by the borrower every month that ensures that the loan is paid off in full with interest at the end of its term. The monthly payment formula is based on the annuity formula. The monthly payment c depends upon:

404 — $r$ - the monthly interest rate, expressed as a decimal, not a percentage. Since the quoted yearly percentage rate is not a compounded rate, the monthly percentage rate is simply the yearly percentage rate divided by 12; dividing the monthly percentage rate by 100 gives r, the monthly rate expressed as a decimal.

406 — $N$ - the number of monthly payments, called the loan's term, and

408 — $P$ - the amount borrowed, known as the loan's principal.

In the standardized calculations used in the United States, c is given by the formula:

402 —
$$c = \begin{cases} \dfrac{rP}{1-(1+r)^{-N}} = \dfrac{rP(1+r)^N}{(1+r)^N-1}, & r \neq 0; \\ \dfrac{P}{N}, & r = 0. \end{cases}$$

METHODS AND SYSTEMS FOR AUTOMATED FEATURE GENERATION UTILIZING FORMULA SEMANTIFICATION

BACKGROUND OF THE INVENTION

Field of the Invention

The present invention relates in general to computing systems, and more particularly, to various embodiments for automated feature generation using semantification of formulas.

Description of the Related Art

Feature generation (or feature learning, feature engineering, etc.) is the task of improving predictive modeling (or machine learning model) performance on a dataset by transforming its feature space. Existing approaches to automate this process often rely on transformed feature space exploration through evaluation-guided search or explicit expansion of datasets with transformed features followed by feature selection.

Such "brute force" approaches typically require significant resources (e.g., with respect to runtime, memory, etc.). Additionally, they often are only effective for large data sets (e.g., deep learning).

SUMMARY OF THE INVENTION

Various embodiments for automated feature engineering, by a processor, are provided. Data associated with a machine learning model is received. The received data is mapped to at least one description associated with the data. A feature for the machine learning model is generated based on a formula within a corpus. The formula is associated with the at least one description.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, feature generation (or feature learning, feature engineering, etc.) is the task of improving predictive modeling (or machine learning model) performance on a dataset by transforming its feature space. Existing approaches to automate this process often rely on transformed feature space exploration through evaluation-guided search or explicit expansion of datasets with transformed features followed by feature selection. Such "brute force" approaches typically require significant resources (e.g., with respect to runtime, memory, etc.) and/or only work for large data sets (e.g., deep learning).

Additionally, some recent approaches have attempted to generate features by defining a search space of the set of all possible feature transformations and developing an efficient exploration strategy through reinforcement learning based on previous examples. While such an approach may be more efficient than exhaustive search methods, the resources required (e.g., runtime) is still prohibitive when dealing with a large number of input data columns or a large number of transformation types and/or when multiple data columns must be combined to form a solution.

Further, some current approaches have utilized neural networks. Although neural networks may be successful in learning useful features with respect to image, video, text, and speech data, other types of data have been proven to be problematic. Also, deep learning typically requires massive amounts of data and is not suitable for situations involving relatively small amounts of data.

To address these needs and/or the shortcomings in the prior art, in some embodiments described herein, methods and/or systems are disclosed that, for example, efficiently generate features for a wide variety of data sets through the use of existing domain knowledge in the form of formulas (or formulae), such as mathematical formulas. For example, a machine learning model (and/or data, data columns, features, etc. thereof) may be "mapped" to or associated with (one or more) descriptions (e.g., textual descriptions, semantic concepts, etc.). One or more formulas may be selected from a knowledge base or index (e.g., generated using domain knowledge, available corpuses, etc.), which is/are similarly mapped to/associated with the same (and/or matching) description(s). The formula(s) may then be utilized to generate new features for the machine learning model.

In other words, in some embodiments, methods and/or systems for automated feature engineering (or generation) are provided in which, for example, new features are added or generated (e.g., to/for an existing machine learning problem or model) using a knowledge base (or index) of formulas (e.g., mathematical formulas) by mapping existing features (and/or data, data columns, etc. related to an existing machine learning model) to formulas in the index and deriving new features (and/or transformations) based on the matched formulas. The existing features may be automatically mapped to identifiers in the mathematical formulas.

The new feature(s) may be constructed from a set of existing features (i.e., associated with the existing machine learning model) by directly applying one or more matched formula. The new feature(s) may also be generated in a process that includes discovering related features by mapping features to identifiers in the formulas and applying a set of transformations to the related features independent of any mathematical relationship(s) in the matched formulas.

The knowledge base (or index or semantic formula index) of mathematical formula may be automatically constructed from structured, semi-structured, and/or unstructured documents (i.e., from a selected corpus), with or without structured representations of the formulas. The documents (and/or corpus) utilized may include, for example, websites, web pages, academic papers (e.g., related to science, engineering, programming, etc.). For example, the documents may include, for example, one or more Portable Document Format (PDF) document, Hypertext Markup Language (HTML) document, an Extensible Markup Language (XML) document, and/or any other suitable type of document (e.g., electronic/digital document).

As one example of a concept to which the methods and systems described herein may be applied, consider the Kaggle Home Credit Risk prediction competition, in which an important feature was (manually) created by taking the amount of the loan in question and dividing it by the size (or amount) of the monthly payment on the loan (i.e., the term of the loan or the length/duration of the loan). The methods/systems described herein allow for the automated generation of such a feature in a manner different from the "brute force" approaches described above. As described below, embodiments described herein utilize already existing domain knowledge in the form of, for example, mathematical equations (i.e., created by a human, manually generated, etc.) which are available in corpuses, such as online databases, documents, etc.

As another example, consider a health-related metric, such as body mass index (BMI), which may be utilized in predicting health-related outcomes for individuals. The definition (e.g., a textual definition or description) of BMI may be located in an available database (e.g., online database, website, etc.), and a mathematical formula for the metric may be extracted or generated based on the definition (e.g., utilizing a natural language processing (NLP) technique). After the formula is extracted, the automated feature engineering described herein may be utilized. As such, it should be understood that the methods and systems described herein may utilize (and/or be applied utilizing) "text-based" formulas as opposed to only formulas that are presented in a structured form or mathematical syntax.

At least some of the aspects of functionality described herein may be performed utilizing a cognitive analysis (or machine learning technique). The cognitive analysis may include natural language processing (NLP) or a NLP technique, such classifying natural language, analyzing tone, and analyzing sentiment (e.g., scanning for keywords, key phrases, etc.) with respect to, for example, content (or data), communications sent to and/or received by users, and/or other available data sources. In some embodiments, natural language processing (NLP), Mel-frequency cepstral coefficients (MFCCs) (e.g., for audio content detected by a microphone), and/or region-based convolutional neural network (R-CNN) pixel mapping (e.g., for object detection/classification in images/videos), as are commonly understood, are used.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, automated feature engineering or generation, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

In particular, in some embodiments, a method for automated feature engineering, by a processor, is provided. Data associated with a machine learning model is received. The received data is mapped to at least one description associated with the data. A feature for the machine learning model is generated based on a formula within a corpus. The formula is associated with the at least one description.

The generating of the feature for the machine learning model may include applying the formula to existing features of the machine learning model. The generating of the feature for the machine learning model may include applying at least one transformation independent of the formula.

A semantic formula index may be generated. The generating of the semantic formula index may include identifying a plurality of formulas in the corpus and mapping each of a plurality of identifiers within the plurality of formulas to a description associated with the respective identifier. The generating of the feature for the machine learning model may include selecting the formula from the plurality of formulas based on the mapping of the plurality of identifiers to the descriptions.

The formula in the corpus may include a structured formula in the corpus or a text-based formula in the corpus. The at least one description may include a textual description and/or a semantic concept entry in a database.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
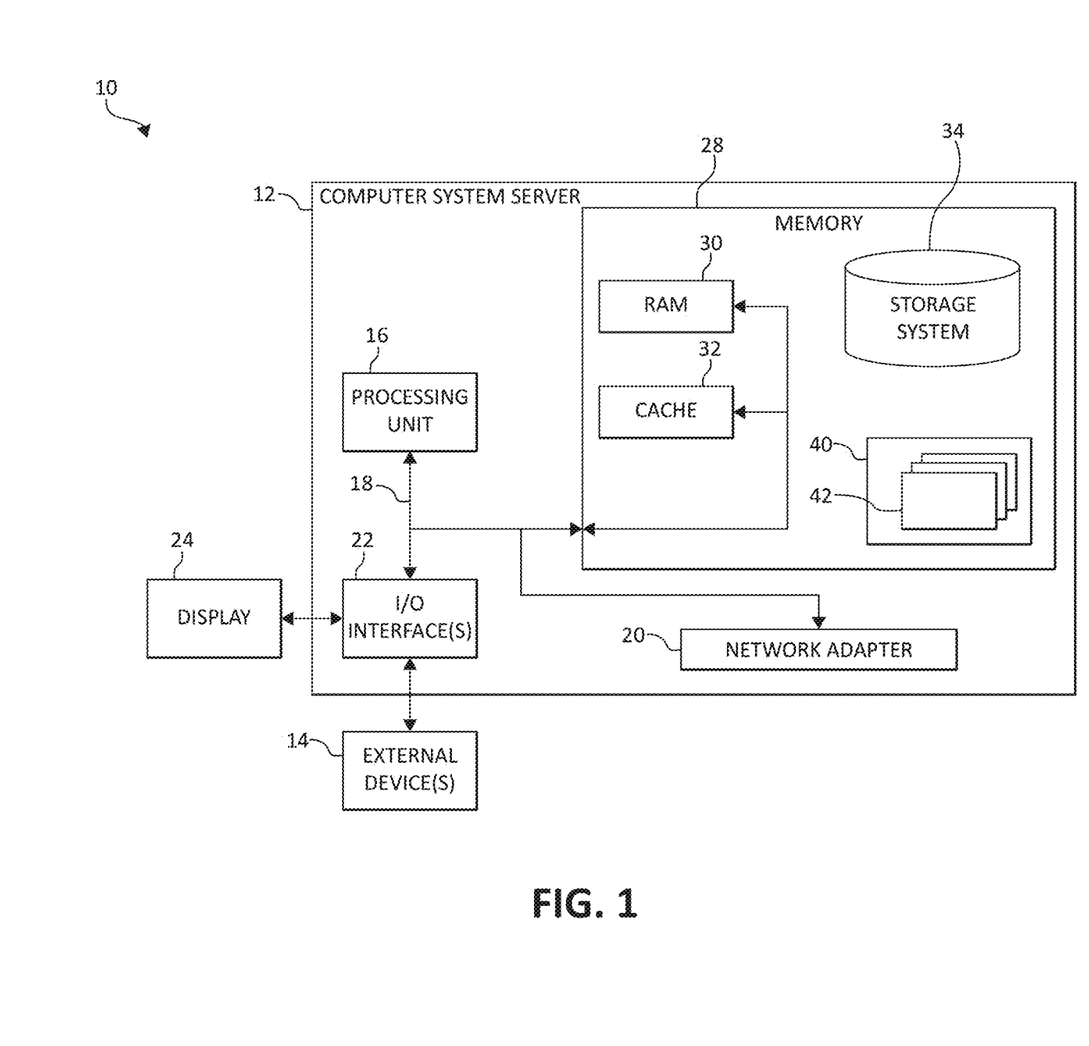
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
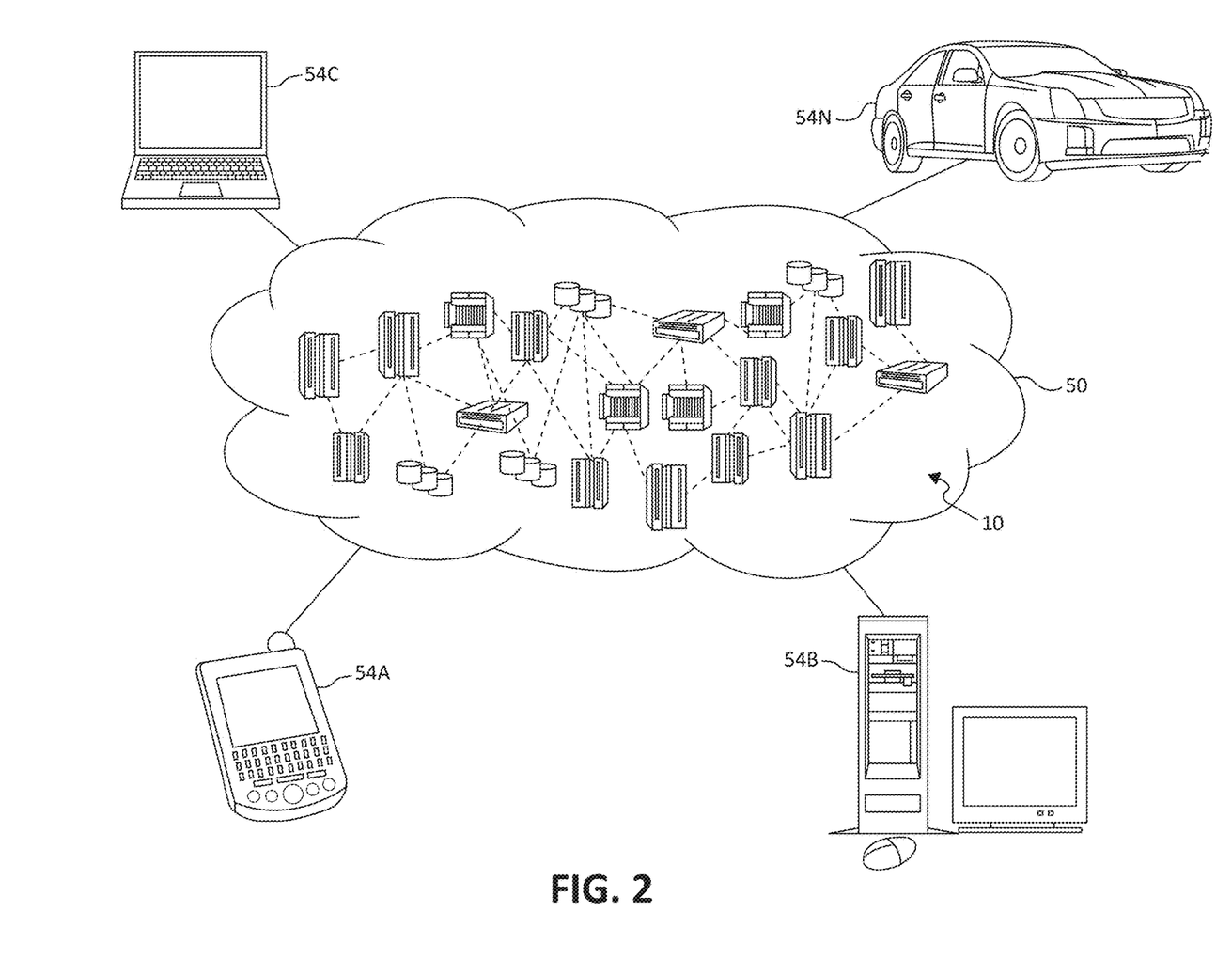
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
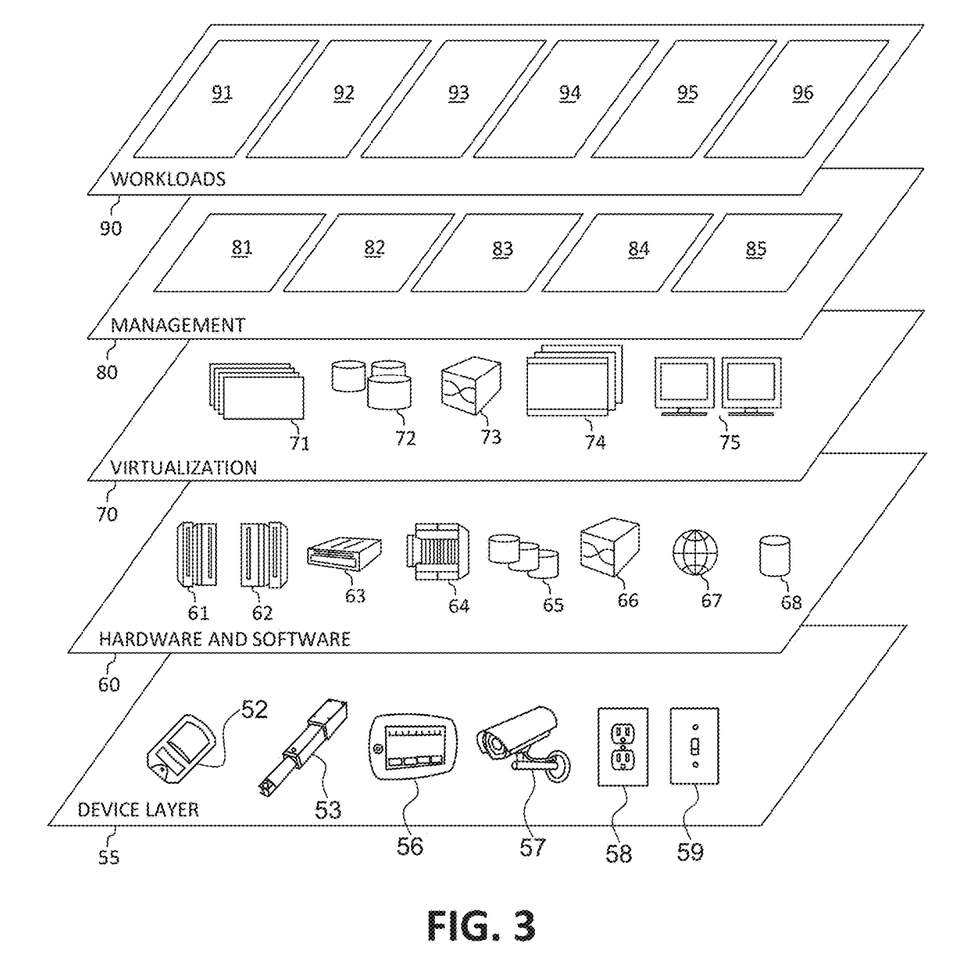
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for automated feature engineering, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems are provided for automated feature engineering are provided. In some embodiments, a machine learning model may be selected for (new) feature generation. The machine learning model (and/or data, data columns, features, etc. thereof) may be "mapped" to or associated with (one or more) descriptions (e.g., textual descriptions, semantic concepts, etc.). One or more formulas may be selected from a knowledge base or index (e.g., generated using domain knowledge, available corpuses, etc.), which is similarly mapped to the same description(s). The formula(s) may then be utilized to generate new features for the machine learning model.

In some embodiments, a corpus (or corpus), such as one or more documents (e.g., text-based documents, websites, web pages, unstructured documents, etc., in particular documents related to scientific fields, engineering, mathematics, etc.) is identified or received (or retrieved) for processing. For each document in the corpus that is determined to include one or more formula (e.g., mathematical formulas) and/or for each of the identified formulas, identifiers within the formula(s) are identified and "mapped" to (or linked to) representative descriptions (e.g., textual descriptions within a document and/or semantic concepts or entries thereof in a database). In other words, an association between the identifiers (e.g., each identifier) and appropriate descriptions and/or the concepts is generated. For example, a link may be formed between a particular identifier and an entry in a database (e.g., a website, a particular webpage, a URL, etc.) and/or a textual description (e.g., within the document in which formula is located or an external source, such as a website). Using the output of the mapping, an index (or semantic formula index or knowledge base) may be generated, which allows for the searching for formulas by, for example, keywords, concepts, etc. This index or knowledge base may be generated before a particular machine learning model is selected for new feature generation and then utilized as described below.

In some embodiments, data, such as data columns (e.g., input and target values), from (or associated with) one or more machine learning problems or models (e.g., predicting a target variable based on the values of one or more input variables) are identified and/or received. The machine learning model(s) may be selected as the model for which new features are to be generated. In some embodiments, the data columns are mapped to, for example, descriptive texts, semantic concepts, etc. (e.g., in a manner similar to the formula identifiers described above). As such, after the data columns are mapped, both formulas (and/or identifiers within formulas) and machine learning model data columns (and/or components thereof) are associated with or "linked" to descriptions, semantic concepts, etc.

The index may then be searched for formulas that link different data columns. In other words, the index may be searched for formulas that are associated with the same textual descriptions, semantic concepts, etc. as the particular machine learning model (and/or the data columns thereof).

New features may then be generated by combining the data columns that were identified as being related through the semantic formulae index. The new features may then be tested to determine if they are appropriately correlated with the target variable, as will be appreciated by one skilled in the art.

More specifically, in some embodiments, the process of mapping identifiers in the formula(s) (and/or the formula(s) as a whole) to descriptions (and/or concepts) may include extracting the identifiers from the formulas, matching the identifiers with descriptions, and matching the descriptions to semantic concepts. As will be appreciated by one skilled in the art, extracting identifiers from formulas may be performed utilizing known techniques, as formulas (e.g., mathematical formulas) are generally represented using a structured representation (e.g., utilizing a program such as texvc), allowing for formula identifiers to be extracted. However, as described above, in some embodiment "text-based" formulas may be utilized, from which structured formulas may be generated (e.g., via NLP techniques).

The matching (or mapping) of identifiers with (or to) descriptions (e.g., textual descriptions, semantic concepts, etc.) may be performed using, for example, heuristic techniques, transfer learning, and/or supervised, semi-supervised, and/or unsupervised machine learning approaches. For example, with respect to heuristic approaches, NLP techniques, such as tokenization and part-of-speech (POS) tagging, may be utilized to generate candidate descriptions for identifiers. The descriptions may then be ranked using, for example, a function parameterized with parameters such as the distance between the identifier and the candidate description, the distance between the candidate description and the top of the page, and/or the frequency of the description term. The matching of the descriptions to semantic concepts may be performed using previously established links associated with a database, such as a specific URL on a website or similar link to another database, which is associated with semantic concepts (e.g., a process similar to semantic grounding, as will be appreciated by one skilled in the art). Additionally, lookup based methods and/or embedding based methods may be utilized.

In some embodiments, the mapping of data columns to descriptions (and/or semantic concepts) may utilize, for example, column values and/or column meta-data as input. With respect to column meta-data, column names (and/or headers) and/or column descriptions may be utilized. Techniques utilized to perform this process may include heuristic rule based methods, machine learning approaches (e.g., supervised, semi-supervised, and/or unsupervised), lookup based methods, and/or embedding based methods. As such, in some embodiments, the mapping of data columns to descriptions may be performed in a manner similar to that utilized for formula identifiers.

As mentioned above, the index (or knowledge base) may then be searched for formulas that link different data columns. More particularly, in some embodiments, formulas involving two or more data columns may be located or identified by using the output from the previous steps. That is, the descriptions returned from the mapping of the data columns to associated semantic concepts/textual descriptions may be used to find relevant formulas using the index generated using the identifiers. Approaches that may be used for this process may utilize, for example, lookup methods, vector embeddings, and/or clustering methods.

New candidate features may then be generated in several ways. For example, related features maybe combined to create new features based on their relationship(s) in the identified formula(s) and/or related features may be combined using common mathematical transformations, such as multiplication, division, etc.

The evaluation of the newly generated features may be performed using standard methods for checking for correlation between variables. More specifically, in some embodiments, the evaluation may be performed by checking the correlation between the newly generated features and the target variables. Also, the newly generated features may be provided as input to and tested with different machine learning models (although this is less efficient but has some advantages, such as being able to combine the new feature with other features).

Figure 4:
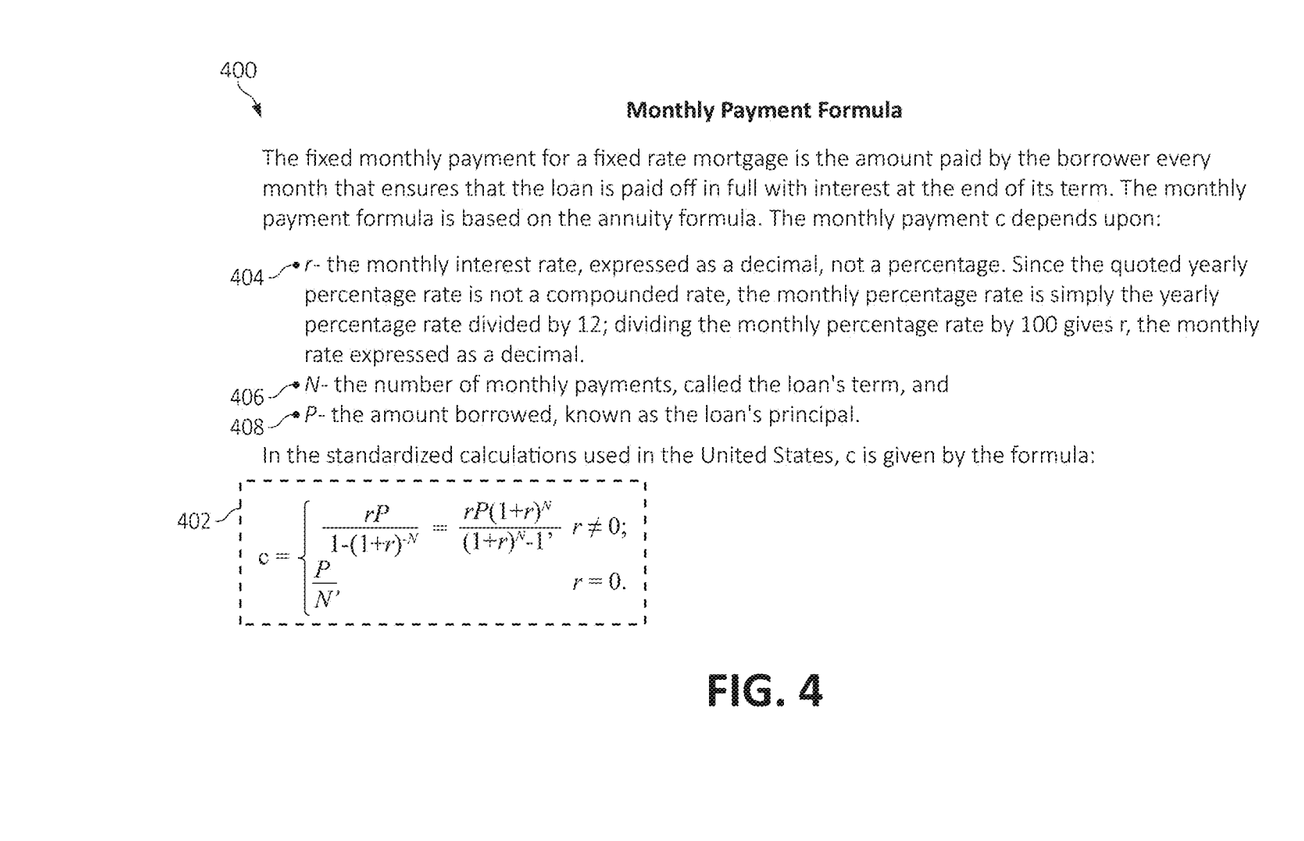
FIG. 4 is a plan view of a document including a formula according to an embodiment of the present invention.

FIG. 4 illustrates an exemplary document (or a portion thereof) 400 that may be utilized by embodiments described herein. The example shown may be understood to include a portion of a webpage or website that has been identified as including (or displaying) a formula 402. However, it should be understood that other types of documents (or corpuses) may be utilized, such as text-based documents, unstructured documents, etc. In the example shown, the formula 402 (and/or the document 400 as a whole) is related to monthly mortgage payments, and the formula 402 includes identifiers, such as c, r, N, and P. As shown, the document 400 also includes information or descriptions of identifiers r, N, and P in sections 404, 406, and 408, respectively, along with information/descriptions of identifier c in the formula 402 and other portions of the text shown in document 400. Also, although not shown in detail, the document 400 (e.g., the descriptions) may include "links" to other, related documents. For example, in section 404, the term "interest rate" may be "hyperlinked" to another webpage (or URL) with information related to that term (e.g., an open source/collaboration website/webpage that includes a knowledge base of concept/entity entries, as will be appreciated by one skilled in the art).

As described above, when the document 400 is received (or processed), the system may extract the identifiers in the formula (e.g., c, r, N, and P) and generate a mapping of the identifiers to appropriate descriptions (e.g., textual descriptions and/or semantic concepts). In the example shown, at least a portion of the descriptions may be included (or identified) within the document 400 (e.g., in sections 404, 406, and 408). However, as described above, descriptions (and/or semantic concepts) may also be located in external documents (e.g., web pages, URLs, etc.), which may or may not be associated with any links provided in the document 400 (e.g., the system may utilize any provided links and/or search external databases for appropriate descriptions, concepts, etc.). Through this mapping, the formula 402 (and/or the identifiers within) may be associated with descriptions, semantic concepts, etc. As described above, this process may be performed on multiple documents, corpuses, etc., and the output thereof may be utilized to generate a knowledge base or semantic formula index all of the identified formulas, which may be utilized by the methods and systems described herein.

Figure 5:
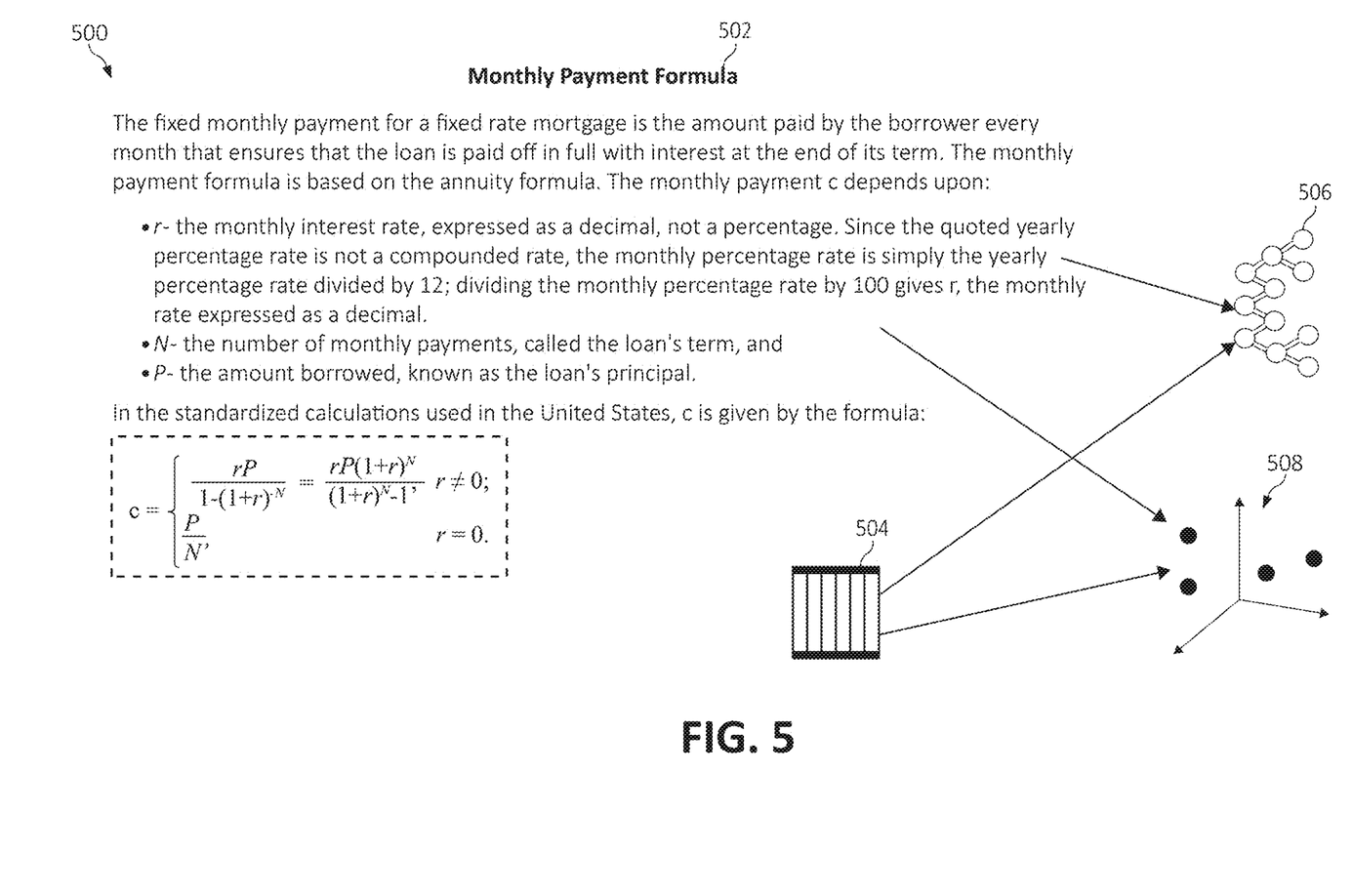
FIG. 5 is a block diagram of a method for automated feature engineering according to an embodiment of the present invention.

FIG. 5 provides a simplified illustration of a method (and/or system) 500 according to an embodiment of the present invention. In the example shown, one or more formula (or one of more document portions including formulas) 502, data columns 504, a knowledge base (or knowledge graph, index, etc.) 506, and a vector space 508 are included. A mapping of the formula(s) 502 (and/or identifiers therein) to descriptions, concepts, etc., may be represented by (or within) the knowledge base 506, as described above.

In some embodiments, the data columns 504 are associated with a selected machine learning model (or problem), in particular, a machine learning model that has been selected for new feature generation. The data columns 504 (and/or information related to the data columns, such as column values, headers, etc.) may be processed in a manner similar to the formula(s) and/or identifier(s) described above such that a mapping of the data columns to descriptions, concepts, etc. is generated. This information related to the data columns may then be utilized to search the knowledge base 506 for formulas that are related to the data columns (e.g., via common descriptions, concepts, etc.). As will be appreciated by one skilled in the art, the vector space 508 may include numerical representations of words, concepts, etc. which may be utilized to determine the similarity between, for example, terms, phrases, etc. in the data columns to those found in the descriptions, concepts, etc. (and/or the document(s)). One or more selected formula may then be utilized to generate new features for the machine learning model associated with the data columns 504, as described above.

As such, in some embodiments, a semantic formula(s) (e.g., mathematical formulas where the identifiers therein have been linked to textual description and/or semantic concepts) are extracted from domain knowledge (e.g., one or more documents, database(s), etc). For example, in some embodiments, structured mathematical formulas are linked with semantic types or entities and/or surface text forms (e.g., terms or text used to represent semantic concepts in natural/spoken/human language). However, in some embodiments, formulas may be generated from natural language (i.e., as opposed to extracting or identifying structured formula(s)) and linked to semantic types/entities and/or surface text forms.

In some embodiments, data (and/or science) columns (e.g., a collection of data values, perhaps all of a single data type that are related in some way, such as through a machine learning model) are linked to semantic types/entities and/or surface text forms. This process may be based on, for example, column values and/or column meta-data (e.g., column names/headers, descriptions, etc.). The data columns may be linked to formulas based on their shared semantic types/entities and/or surface text forms. New candidate features may be generated by, for example, combining existing data columns in a manner derived from related mathematical equations (and/or formulas).

In some embodiments, methods (and/or systems) for automated feature engineering are provided in which new features are added (or generated) utilizing a knowledge base of (or that includes) one or more formula (e.g. mathematical formula). Existing features may be mapped to one or more formula in the knowledge base, and new features (and/or transformations) may be derived based on the matched formula(s).

The new features may be constructed from a set of existing features by directly applying one or more matched formulas to the existing features. Related features may be discovered by mapping features to identifiers in the formula(s). New features may be generated by applying a set of transformations to the discovered related features independent of any mathematical relationship in the matched formula(s).

The knowledge base of (or that includes) the mathematical formula(s) may be automatically constructed from semi-structured and/or unstructured documents with or without structured representations of the formula(s). The existing features may be automatically mapped to identifiers in the formula(s).

The embodiments described herein may provide improved methods for discovering (or generating, engineering, etc.) new features, as running times and costs may be reduced. In contrast, if the time allotted for such a task utilizing the "brute force" methods described above is limited, some potentially valuable features may be missed. Additionally, the methods and systems described herein allow for newly created features to be "linked" to descriptions, semantic concepts, etc., allowing for semantic analysis approaches to be applied to newly generated features. In this manner, the methods and systems described herein may also improve the "explainability" or "interpretability" of results generated using the features and/or machine learning model(s), which may be valuable to machine learning models where user's desire the ability to interpret the reason(s) for a model's predictions/results.

Figure 6:
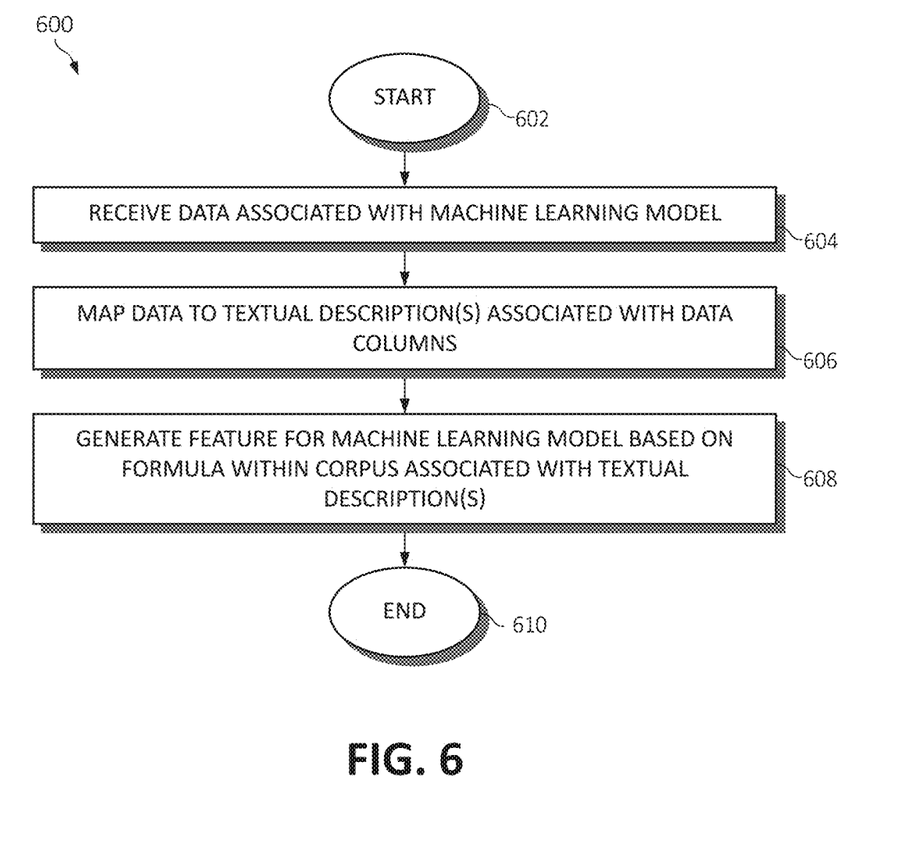
FIG. 6 is a flowchart diagram of an exemplary method for automated feature engineering according to an embodiment of the present invention.

Turning to FIG. 6, a flowchart diagram of an exemplary method 600 for automated feature engineering is provided. The method 600 begins (step 602) with, for example, a corpus (e.g., one or more documents, web pages, etc.) being received or selected, and the corpus being processed to generate a knowledge base or semantic formula index (e.g., in which formulas and/or identifiers within the formulas are mapped to descriptions, semantic concepts, etc.), as described above. For example, the generating of the semantic formula index may include identifying a plurality of formulas in the corpus and mapping each of a plurality of identifiers within the plurality of formulas to a description (e.g., textual description and/or semantic concept) associated with the respective identifier.

Data associated with a machine learning model is received (step 604). The received data may include (and/or be in the form of) data columns (e.g., column values, headers, descriptions, etc.) associated with a machine learning model (i.e., a machine learning model selected for new feature generation/engineering).

The received data is mapped to at least one textual description associated with the data (step 606). The at least one textual description may include, for example, a semantic concept entry in a database and/or surface text in a document.

A feature for the machine learning model is generated based on a formula within a corpus (step 608). The formula is associated with the at least one textual description (i.e., via the semantic formula index). The formula may include a structured formula in the corpus or a text-based formula in the corpus. The generating of the feature for the machine learning model may include selecting the formula from the plurality of formulas based on the mapping of the plurality of identifiers to the textual descriptions (i.e., based on the semantic formula index). The generating of the feature for the machine learning model may include applying the formula to existing features of the machine learning model and/or applying at least one transformation independent of the formula.

Method 600 ends (step 610) with, for example, the generated feature(s) being evaluated using, for example, standard methods for checking for correlation between variables. More specifically, in some embodiments, the evaluation may be performed by checking the correlation between the newly generated features and the target variables. In some embodiments, feedback from users may be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for automated feature engineering, by a processor, comprising:
receiving data associated with a machine learning model;
mapping the received data to at least one description associated with the data, wherein the received data includes a textual identifier denoting an intended meaning of a particular variable included in a formula identified from a document, wherein the at least one description comprises a textual description describing the intended meaning of the textual identifier, and wherein the textual description is determined by examining the document and any externally linked documents to the document to identify the intended meaning of the particular variable represented by the textual identifier; and
generating a feature for the machine learning model based on the formula within a corpus, wherein the formula is a mathematical formula associated with the at least one description, and wherein generating the feature includes respectively mapping existing features to mathematical formulas and deriving the feature as a new feature based on a matched description between the mathematical formulas of the existing feature and the new feature.

2. The method of claim 1, wherein the generating of the feature for the machine learning model includes applying the formula to the existing features of the machine learning model.

3. The method of claim 1, wherein the generating of the feature for the machine learning model includes applying at least one transformation independent of the formula.

4. The method of claim 1, further comprising generating a semantic formula index, wherein the generating of the semantic formula index includes identifying a plurality of formulas in the corpus and mapping each of a plurality of identifiers within the plurality of formulas to a description associated with the respective identifier.

5. The method of claim 4, wherein the generating of the feature for the machine learning model includes selecting the formula from the plurality of formulas based on said mapping of the plurality of identifiers to the descriptions.

6. The method of claim 1, wherein the formula in the corpus includes a structured formula in the corpus or a text-based formula in the corpus.

7. The method of claim 1, wherein the at least one description includes at least one of a textual description and a semantic concept entry in a database.

8. A system for automated feature engineering comprising:
a processor executing instructions stored in a memory device, wherein the processor:
receives data associated with a machine learning model;
maps the received data to at least one description associated with the data, wherein the received data includes a textual identifier denoting an intended meaning of a particular variable included in a formula identified from a document, wherein the at least one description comprises a textual description describing the intended meaning of the textual identifier, and wherein the textual description is determined by examining the document and any externally linked documents to the document to identify the intended meaning of the particular variable represented by the textual identifier; and
generates a feature for the machine learning model based on the formula within a corpus, wherein the formula is a mathematical formula associated with the at least one description, and wherein generating the feature includes respectively mapping existing features to mathematical formulas and deriving the feature as a new feature based on a matched description between the mathematical formulas of the existing feature and the new feature.

9. The system of claim 8, wherein the generating of the feature for the machine learning model includes applying the formula to the existing features of the machine learning model.

10. The system of claim 8, wherein the generating of the feature for the machine learning model includes applying at least one transformation independent of the formula.

11. The system of claim 8, where the processor further generates a semantic formula index, wherein the generating of the semantic formula index includes identifying a plurality of formulas in the corpus and mapping each of a plurality of identifiers within the plurality of formulas to a description associated with the respective identifier.

12. The system of claim 11, wherein the generating of the feature for the machine learning model includes selecting the formula from the plurality of formulas based on said mapping of the plurality of identifiers to the descriptions.

13. The system of claim 8, wherein the formula in the corpus includes a structured formula in the corpus or a text-based formula in the corpus.

14. The system of claim 8, wherein the at least one description includes at least one of a textual description and a semantic concept entry in a database.

15. A computer program product for automated feature engineering, by a processor, the computer program product embodied on a non-transitory computer-readable storage medium having computer-readable program code portions stored therein, the computer-readable program code portions comprising:
an executable portion that receives data associated with a machine learning model;
an executable portion that maps the received data to at least one description associated with the data, wherein the received data includes a textual identifier denoting an intended meaning of a particular variable included in a formula identified from a document, wherein the at least one description comprises a textual description describing the intended meaning of the textual identifier, and wherein the textual description is determined by examining the document and any externally linked documents to the document to identify the intended meaning of the particular variable represented by the textual identifier; and
an executable portion that generates a feature for the machine learning model based on the formula within a corpus, wherein the formula is a mathematical formula associated with the at least one description, and wherein generating the feature includes respectively mapping existing features to mathematical formulas and deriving the feature as a new feature based on a matched description between the mathematical formulas of the existing feature and the new feature.

16. The computer program product of claim 15, wherein the generating of the feature for the machine learning model includes applying the formula to the existing features of the machine learning model.

17. The computer program product of claim 15, wherein the generating of the feature for the machine learning model includes applying at least one transformation independent of the formula.

18. The computer program product of claim 15, wherein the computer-readable program code portions further include an executable portion that generates a semantic formula index, wherein the generating of the semantic formula index includes identifying a plurality of formulas in the corpus and mapping each of a plurality of identifiers within the plurality of formulas to a description associated with the respective identifier.

19. The computer program product of claim 18, wherein the generating of the feature for the machine learning model includes selecting the formula from the plurality of formulas based on said mapping of the plurality of identifiers to the descriptions.

20. The computer program product of claim 15, wherein the formula in the corpus includes a structured formula in the corpus or a text-based formula in the corpus.

21. The method of claim 15, wherein the at least one description includes at least one of a textual description and a semantic concept entry in a database.

* * * * *